United States Patent Office 3,296,171
Patented Jan. 3, 1967

3,296,171
HEAT STABLE ACRYLONITRILE POLYMER COMPOSITIONS AND MEANS FOR MANUFACTURE THEREOF
John H. Hennes and Charles R. Pfeifer, Newport News, Va., assignors to The Dow Chemical Company, Midland, Mich., a corporation of Delaware
No Drawing. Filed Aug. 23, 1963, Ser. No. 304,235
12 Claims. (Cl. 260—29.6)

This invention relates to heat stabilized compositions comprised of acrylonitrile polymers and to a means for their manufacture.

It is well known that acrylonitrile polymers are well accepted for the preparation of various molded, extruded and otherwise fabricated shapes including films, foils, ribbons and the like and particularly for the preparation of synthetic fibers. Because of the relatively high melting temperatures of such polymers and their tendency to decompose when held at melting temperatures for any length of time, melt extrusion or fabrication techniques are not well adapted for fabricating shaped articles from these polymers. Instead, fabrication from solutions of the polymers are most frequently employed, almost exclusively when acrylonitrile polymers are being extruded into fibers or filaments.

However, it is frequently observed that the fabricated articles e.g., fibers, when extruded from solutions tend to be discolored or at least to be heat sensitive so that they subsequently discolor when exposed to elevated temperatures for any length of time. This seems to follow whether the polymers are dissolved in the known organic solvents for the polymers or the known aqueous saline solutions that are solvents for the polymers, although discoloration from the latter solvents may more frequently be noted. This tendency to discolor is often more pronounced and more frequently observed when the polymer is homopolymeric acrylonitrile. The reasons for this are not fully known but one possibility is that other monomers polymerized in the polymer chain may enhance initial whiteness and heat stability of the article fabricated therefrom.

It is the chief concern and primary object of this invention to provide acrylonitrile polymer compositions that are excellently well suited to be fabricated into shaped articles having improved whiteness as well as improved resistance to heat discoloration (improved heat stability). It is a further object to provide a means for the preparation, in situ, of the foregoing acrylonitrile polymer compositions.

These as well as additional objects and associated advantages and benefits are achieved in and by the practice of the present invention which provides a composition of matter comprising a polymer of an ethylenically unsaturated monomeric material containing at least about 80 weight percent acrylonitrile, a solvent for said polymer, and between about 0.1 and about 5 weight percent, based on the weight of the polymer, of a water soluble zirconium salt.

In another embodiment of the invention, when the solvent is an aqueous saline solution, the foregoing compositions are prepared by polymerizing an ethylenically unsaturated monomeric material containing at least about 80 weight percent acrylonitrile dissolved in an aqueous saline solution that is a solvent for said monomeric material and polymers therefrom in the presence of from about 0.1 to about 5 weight percent, based on the weight of the dissolved monomeric material, of a water soluble zirconium salt.

Thus, the present invention takes advantage of the finding that acrylonitrile polymer articles having excellent initial whiteness, being essentially free from coloration, and having excellent resistance to discoloration upon exposure to heat or elevated temperatures can be fabricated from conventional solutions of the polymers when the polymer solution has incorporated therein a water soluble zirconium compound. Articles fabricated from the present compositions, for example, fibers, which are frequently observed to have, in their freshly prepared condition, a yellowish coloration, are obtained having an excellent and highly acceptable white lustrous appearance when prepared from the present compositions. Additionally if the polymeric articles are fabricated from solutions wherein the zirconium compound is absent, even if initially obtained with a good initial whiteness, it is generally experenced that they will badly discolor when subsequently exposed to elevated temperatures. For instance, when such an article, e.g. a fiber, is exposed or contacted with heated elements at about 200° C. for 5 minutes the fiber turns a yellowish-orange color. This is significantly diminished if not prohibited when the compositions of the invention are employed.

The acrylonitrile polymer solvents that are employed in the compositions are any of the conventional and well known polyacrylonitrile solvents including dimethylformamide, dimethylacetamide, dimethylsulfoxide, ethylene carbonate, butyrolactone and the like or the various saline polyacrylonitrile-dissolving solvents. The utile, known aqueous saline solvents for various and particularly fiber-forming acrylonitrile polymers and polyacrylonitrile include zinc chloride, the various thiocyanates such as calcium and sodium thiocyanate, lithium bromide, salt mixtures of the so-called "lyotropic" series, and others recognized by the art as has been disclosed, among other places, in United States Letters Patents Nos. 2,140,921; 2,425,-192; 2,648,592; 2,648,593; 2,648,646; 2,648,648; 2,648,-649; and 2,949,435. Advantageously, aqueous zinc chloride solutions are used for the purpose.

Exemplary of some of the monomeric materials that may be employed with the acrylonitrile in the preparation of the acrylonitrile polymers and copolymers including especially fiber-forming systems and used in the compositions in accordance with the practice of the present invention include allyl alcohol, vinyl acetate, acrylamide, methacrylamide, methyl acrylate, vinyl pyridine, ethylene sulfonic acid and its alkali metal salts, 2-methylpropene sulfonic acid, vinyl benzene sulfonic acid and its salts, 2-sulfoethyl methacrylate and its salts, vinyl lactams such as vinyl caprolactam and vinyl pyrrolidone, etc. and mixtures thereof.

The zirconium salts found useful for employment in the present compositions for enhancing the initial whiteness and heat stability of the acrilonitrile polymer fibers and other articles prepared from the compositions are those having some water solubility, or at least good dispersibility in the acrylonitrile polymer solvent that is used. These need not be infinitely water soluble, or solvent dispersible, but only to a small extent since only a relatively small amount of the zirconium salt based on solution weight is required in the compositions to achieve the desired results. Thus, exemplary of some of the zirconium salts that can be employed in the present compositions are zirconium tetrachloride, zirconyl chloride, zirconium tetrabromide, zirconyl nitrate, carbonated hydrous zirconia, zirconium acetate, zirconium sulfate, including their partially hydrolyzed and partially neutralized forms. Advantageously, zirconium oxychloride or zirconyl chloride is employed.

The amount of the zirconium salt that is beneficially employed in the compositions depends primarily on the amount of polymer solids in the solution which in turn in most respects depends on the particular solvent that is used, the type of article that is to be fabricated, and, the method by which the solution is to be processed into a shaped article, for example, in synthetic fiber manufacture, whether wet or dry spinning is to be used. Generally, between about 0.1 and about 5 weight percent of the zirconium salt is employed, and beneficially, between about 0.5 and 2 weight percent, based on the weight of polymer solids in the solution. If amounts much less than about 0.1 weight percent are used the beneficial initial whiteness and heat stability of the polymeric article may not be obtained, whereas, if amounts much in excess of about 5 weight percent are employed the ease of fabrication of the solution may be interefered with or undesirable side effects may crop up in the fabricated article.

Most any convenient means for preparing the compositions can be employed. The zirconium salt can be first dissolved or dispersed in the polymer solvent after which the acrylonitrile polymer is dissolved therein, or, the reverse order of first dissolving the polymer followed by introducing the zirconium salt into the solution, or, the zirconium salt and polymer can be added to the solvent simultaneously, or first combined and then added to the solvent. In order to expedite dissolution and to assure uniform mixing it may be advantageous to first form a relatively concentrated solution of the zirconium salt and the polymer before mixing with the principal solvent body. In the instances when the solvent is an aqueous solvent, e.g. an aqueous saline solvent, the zirconium salt, when water soluble, can be added as a water solution in relatively concentrated form, e.g., 25–30 weight percent, to minimize dilution of the saline solvent.

One convenient means well adapted for the purpose of preparing the present compositions when the acrylonitrile polymer is obtained from a previous slurry or dispersion polymerization is to subject the freshly prepared polymer solids after separation from the polymerization medium to a final wash with an aqueous solution of the zirconium salt. The polymer solids thus washed are then dissolved in the desired polymer solvent.

As indicated, when the polymer solvent is an aqueous saline solution in which the monomeric materials can be polymerized the acrylonitrile polymers compositions can be prepared in situ. These are the type of aqueous saline solutions referred to herein before that are solvents for the ethylenically unsaturated monomeric material containing at least about 80 weight percent acrylonitrile and polymers therefrom. In preparing these solutions the zirconium salt is added with the monomeric material to the aqueous saline solvent, and generally a suitable polymerization catalyst is added, and then, the solution is subjected to polymerization conditions. The resulting polymer solution can then be used, usually after some intermediate treatments such as removal of unpolymerized monomer and/or debubbling, directly as a polymer extrusion solution. This means of preparing such polymer solutions is particularly advantageous in view of the viscous nature of this type of acrylonitrile polymer solution. For instance, an aqueous 60 percent zinc chloride solution containing 8–15 weight percent of an acrylonitrile polymer will usually have a viscosity in the neighborhood of 3000–5000 poises. It will be appreciated that mixing with such solutions is difficult and requires considerable energy. When this particular method is used thorough and uniform mixing of the zirconium salt is achieved before the high viscosities are reached.

It is advantageous when adding the zirconium salt to the aqueous saline solution polymerization medium that the zirconium salt have the same anion as the anion of the salt constituent of the saline medium. Thus, for example, when an aqueous zinc chloride solution is employed zirconyl chloride or zirconium tetrachloride is beneficially used.

The amount of the zirconium salt added with the monomeric material will usually be between about 0.1 and about 5 weight percent, based on the weight of the monomeric material. It is usually desirable to employ only the minimum quantity of the zirconium salt required to effectuate the desired result. Larger quantities may tend to interfere with or otherwise influence the polymerization such as reducing the polymerization rate. Preferably, between about 0.5 and 2 weight percent based on monomeric material weight of the zirconium salt is employed in the solution. For the most part, however, it is surprising that the zirconium salt can be present during the polymerization without adverse effect. The polymeric articles extruded from these solutions have excellent initial whiteness and heat stability and absent are any apparent detractive qualities due to the presence of the zirconium salt.

The following examples further illustrate the invention wherein, unless otherwise specified, all parts and percentages are by weight.

*Example I*

To a resin flask equipped with a turbine stirrer and a nitrogen inlet at the bottom of the flask were added in the order listed:

| | | |
|---|---|---|
| 60% zinc chloride solution in water | g | 1,400 |
| Zirconyl chloride octahydrate | g | 1.70 |
| Acrylonitrile | ml | 157 |
| Methyl acrylate | ml | 13.0 |
| 2-sulfoethyl methacrylate, zinc salt | g | 3.36 |
| 4.9% hydrogen peroxide solution in water | ml | 8.00 |

Before peroxide addition the ingredients were stirred while nitrogen was added to displace air from the system. The temperature of the solution was controlled at 50° C. plus or minus 2° C.

The peroxide solution was added and the system stirred over a period of three hours with the temperature maintained at 50° C. During this period the solution became viscous and heat was evolved. The solution was then permitted to cool gradually with continued stirring to 25° C. over a period of approximately two hours. Stirring at 25° C. was continued for an additional 18 hours.

The viscous solution was then heated gradually to 50° C. with vacuum applied to the system. After 45 minutes the solution temperature had risen to 50° C. and the vapor pressure above the solution was approximately 90 mm. mercury absolute pressure. During this vacuum treatment substantially all of the residual acrylonitrile and methyl acrylate monomers were removed together with a minor portion of the water present.

The solution was cooled to 25° C. and returned to atmospheric pressure by admission of air into the system. The resulting clear polymer solution was free of bubbles and had a viscosity of 4000 poises.

The acrylonitrile polymer solution thus prepared was spun into fibers by extruding the solution through a spinnerette having 488 4-mil diameter orifices into a aqueous about 32 percent zinc chloride solution at about 32° C. The filaments were washed, hot stretched and dried at about 125° C. to characteristically hydrophobic textile filaments having a tenacity of about 5.2 grams/denier and 22 percent extensibility, and an average denier of about 6.

The resulting fibers appeared very white and had a high luster. The whiteness was analytically determined by comparing with a reflectometer the reflectance from a pad of fibers with the reflectance from a standard white porcelain tile. A reflectance of 91 percent was recorded for the fibers (based on a reading of 100 from the tile).

The heat stability of the fibers was determined according to the following procedure. Samples of the fibers were cut into short staple lengths and formed into an aqueous slurry in a Waring Blendor. The slurry was poured through a filter to form a pad of the fibers which was dried leaving about a 3/16 inch thick pad of the fibers. The pad was then pressed between two metal plates of an AATCC Scorch Tester at 205° C. for 5 minutes. The measuring head of a Photovolt Corporation reflectometer fitted with a green tri-stimulus filter was first placed on the unscorched portion of the pad and the instrument adjusted to a reflectance reading of 100; a reflectance reading was then taken on the scorched portion of the fiber pad. The difference in reflectance is a measure of the color formation due to heat. The recorded values are the number of units below the control value of 100. The smaller the recorded value the less change from the unscorched reading and hence the better the heat stability of the fiber. A reading of 26 (i.e., 26% color change) was obtained from the fibers which were observed to be a light tan.

In contrast, when fibers were prepared following the same foregoing procedure with the exception that the addition of the zirconyl chloride was omitted, the fibers as initially obtained after being dried had a yellowish appearance and gave a reflectance reading of 85. When subjected to the scorch test to ascertain heat stability the fibers turned a yellowish-brown and a reading of 65 (i.e., 65% color change) was observed on the fibers.

*Example 2*

To a reaction vessel equipped with a thermometer were added:

| | Grams |
|---|---|
| Acrylonitrile | 26.55 |
| Methyl acrylate | 3.00 |
| 2-sulfoethyl methacrylate | 0.57 |
| $Na_2S_2O_5$ | 0.30 |
| $Zr(SO_4)_2 \cdot 4H_2O$ | 0.30 |
| 60% zinc chloride solution | 270 |

The solution was prepurged with nitrogen and the polymerization conducted at 40° C. for 1.5 hours. After this time, the polymer solution was cast into a film in order to determine the heat stability of the polymer.

Film casting was accomplished by first spreading the polymer solution on a glass plate to a film of uniform thickness with a polished, inert metal bar indented to proper film thickness. The glass plate was then immersed in a bath containing 25% isopropanol in water to coagulate the film. The film was stripped manually from the glass and soaked in fresh water for several hours. The clean, wet films were chopped into a slurry in a Waring Blendor. The slurry was then filtered through a Buchner-type funnel to form a pad 3¼ inches long by one inch wide. The pad was dried, covered on each side with filter paper, and placed in an Atlas Electric Devices, Inc. scorch tester at 135° C. for 45 seconds. One-half of this pad was then covered with a pair of clean metal plates, and the covered portion heated for two minutes in a second scorch tester at 205° C. After cooling to room temperature, reflectance values of the scorched and unscorched portions were compared as detailed in Example 1.

The film had a heat stability rating of 22.

*Example 3*

To a reaction vessel equipped with a thermometer are added:

| | Grams |
|---|---|
| Acrylonitrile | 30.2 |
| $K_2S_2O_8$ | 0.18 |
| $Na_2S_2O_8$ | 0.30 |
| 60% $ZnCl_2$ solution | 270 |
| $ZrOCl_2$ | 0.60 |

The solution is prepurged with $N_2$ and the polymerization run for fifteen minutes at 20° C. After this time, the polymer solution is cast into a film according to the procedure of Example 2. The film has a heat stability rating, according to the procedure of Example 2, of 27.

*Example 4*

A polymer solution was prepared in the same manner using identical amounts of reagents as in Example 2, with the exception that no $ZrOCl_2$ was included in the reaction mass and the reaction was heated in a water bath at 40° C. for 30 minutes.

The polymer solution was cast into a film following the procedure of Example 2. The film product was divided into two parts designated "A" and "B." Part "A" was evaluated for heat stability following the procedure of Example 2 and had a rating of 58. Part "B" was redissolved in 60% $ZnCl_2$ to which had been added 2% $ZrOCl_2$ (based on total polymer). Films recast from this solution had a heat stability rating of 20.

*Example 5*

Polymer solutions were prepared in a manner identical with Example 3 (i.e., no zirconyl chloride was present in the reaction mass), with the exception that the polymerization temperature was varied. In addition, in some cases, 1% $ZrOCl_2$ (based on solution weight was added to the coagulant solution (25% isopropanol in water). Heat stability ratings were made on the various samples and the results are recorded in Table I below:

| Sample No. | Polymerization Temperature, ° C. | $ZrOCl_2$ in Coagulation Bath | Heat Stability Rating |
|---|---|---|---|
| A | 55 | 0 | 33 |
| B | 55 | 1 | 14 |
| C | 60 | 0 | 41 |
| D | 60 | 1 | 10 |
| E | 70 | 0 | 39 |
| F | 70 | 1 | 20 |

*Example 6*

One hundred and seventy-seven grams acrylonitrile, twenty grams methyl acrylate, 3.22 grams 2-sulfoethyl methacrylate, zinc salt, 1.37% hydroxylamine disodium sulfonate and 2% $Na_2S_2O_5$ (both based on monomer weight) were separately metered into a reaction kettle containing 800 grams of distilled, demineralized water. The monomers and water were purged with $N_2$ before addition to remove any air. The reaction mixture was heated to a temperature of 55° C. and blanketed with $N_2$. The reaction mass was polymerized at this temperature for three hours. Conversion was 85.5%. The polymer sample was divided into two equal parts designated "A" and "B." Part "A" was filtered, washed well with demineralized water and acetone to remove traces of unreacted monomer and other impurities and dried at room temperature (25° C.) under reduced pressure. The molecular weight of the dried polymer sample was 264,090. The dried polymer sample "A" was then dissolved in purified 60% zinc chloride solution and cast into films following the procedure of Example 2. The films formed from the polymer solution had a heat stability rating of 35.

Part "B" was treated in a manner identical to part "A," except the wash water solution contained 1% $ZrOCl_2$ and the washing was followed by several washings of demineralized water to remove excess zirconium salt from the polymer. The polymer was dried and cast into films following the procedure used for part "A". The dried polymer film had a heat stability rating of 1 and a Zr content of 1.7% (X-ray analysis).

Similar excellent results to the foregoing are obtained when other acrylonitrile polymers and solvents therefor and other of the indicated zirconium salts are employed in accordance with the present invention.

What is claimed is:
1. A composition of matter comprising
 (a) a polymer of an ethylenically unsaturated monomeric material containing at least about 80 weight percent acrylonitrile;
 (b) a solvent for said polymer; and
 (c) between about 0.1 and about 5 weight percent, based on polymer weight, of a water soluble zirconium salt.

2. The composition of claim 1, wherein said polymer is polyacrylonitrile.

3. The composition of claim 1, wherein said polymer is a terpolymer of acrylonitrile, sulfoethyl methacrylate and methyl acrylate.

4. The composition of claim 1, wherein said solvent is an aqueous about 55 to 65 weight percent zinc chloride solution.

5. The composition of claim 1, containing between about 0.5 and about 2 weight percent, based on polymer weight, of said zirconium salt.

6. The composition of claim 1, wherein said zirconium salt is zirconyl chloride.

7. Method for preparing a solution of an acrylonitrile polymer from which shaped articles can be manufactured having improved initial whiteness and heat stability comprising polymerizing an ethylenically unsaturated monomeric material containing at least about 80 weight percent acrylonitrile dissolved in an aqueous saline solution that is a solvent for said monomeric material and polymers therefrom, said solution having incorporated therein between about 0.1 and about 5 weight percent, based on the weight of said monomeric material, of a water soluble zirconium salt.

8. The method of claim 7, wherein said monomeric material consists essentially of acrylonitrile.

9. The method of claim 7, wherein said monomeric material consists essentially of a mixture of acrylonitrile, sulfoethylmethacrylate and methylacrylate.

10. The method of claim 7, wherein said aqueous saline solution is an aqueous about 55 to 65 weight percent zinc chloride solution.

11. The method of claim 7, wherein said solution has incorporated therein between about 0.5 and about 2 weight percent of said zirconium salt.

12. The method of claim 7, wherein said zirconium salt is zirconyl chloride.

References Cited by the Examiner
UNITED STATES PATENTS

| | | | |
|---|---|---|---|
| 2,648,647 | 8/1953 | Stanton et al. | 260—29.6 |
| 2,984,634 | 5/1961 | Caldwell et al. | 260—45.75 |
| 3,079,358 | 2/1963 | Uelzmann | 260—29.6 |
| 3,194,862 | 7/1965 | Coover et al. | 260—29.6 |

MURRAY TILLMAN, *Primary Examiner.*

SAMUEL H. BLECH, *Examiner.*

J. L. WHITE, *Assistant Examiner.*